Sept. 6, 1932.   J. GOOD   1,875,589
INTERNAL COMBUSTION ENGINE
Filed Nov. 21, 1924
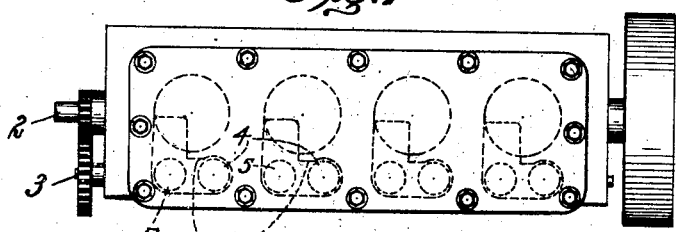
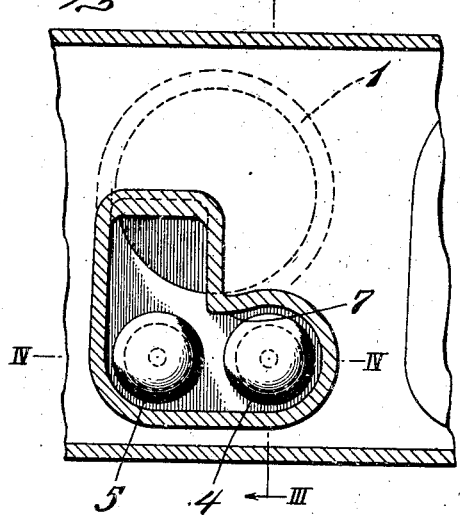 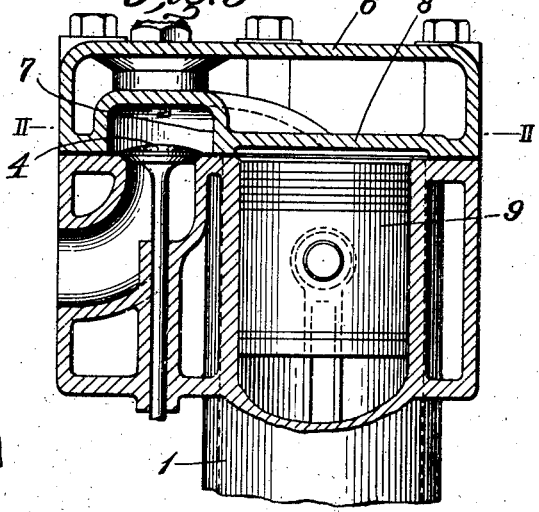
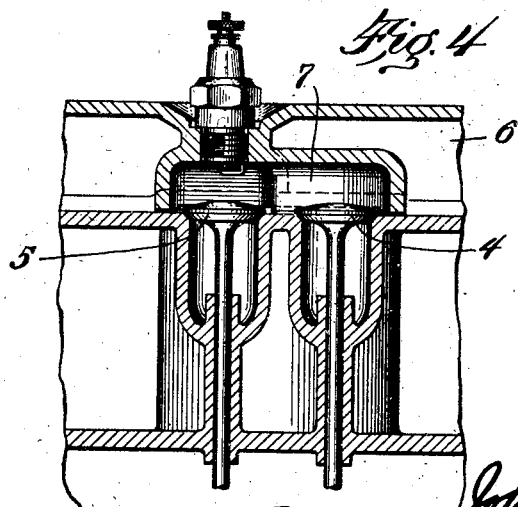
INVENTOR
John Good
BY
Jeffery Kimbro Egleston
ATTORNEY Patented Sept. 6, 1932

1,875,589

UNITED STATES PATENT OFFICE

JOHN GOOD, OF GARDEN CITY, NEW YORK, ASSIGNOR, BY MESNE ASSIGNMENTS, TO WAUKESHA MOTOR COMPANY, OF WAUKESHA, WISCONSIN, A CORPORATION OF WISCONSIN

INTERNAL COMBUSTION ENGINE

Application filed November 21, 1924. Serial No. 751,214.

The invention relates to internal combustion engines and more particularly to the design of the valve porting and combustion space therein and its object is to provide greater turbulence in the compression space and to keep the exhaust valve cooler, thereby improving the efficiency and durability of the engine, and to accomplish these results in an engine otherwise of standard structural design.

In the accompanying drawing, Fig. 1 represents a top plan of a four-cylinder engine embodying the invention, the arrangement of the cylinders and their valves being indicated by dotted lines.

Fig. 2 is a horizontal section of a portion of the cylinder head on line II—II of Fig. 3.

Fig. 3 is a section of Fig. 2 on line III—III; and

Fig. 4 is a section of Fig. 2 on line IV—IV.

The cylinders of the engine are marked 1, being water jacketed, as usual, and they are arranged as usual in the plane of their common crank shaft 2. The cam shaft is marked 3. Each cylinder is provided with an intake valve 4 and an exhaust valve 5 and the row of valves is parallel with the longitudinal axis of the engine, and, in the present case, they are situated directly above the cam shaft 3 so as to be operated by the latter. The cylinder head 6 is common to all of the cylinders in the present case and removable, although this is not necessary. For each cylinder, the head is formed with an interior deflecting wall 7 situated between the intake valve 4 and the piston space and this wall has the effect of deflecting or directing the incoming medium or carbureted mixture longitudinally of the engine and over or adjacent to the exhaust valve 5, whence it passes laterally and downwardly to the piston space. The part of the cylinder head wall, on the piston side of the deflecting wall 7 and which is marked 8 in the drawing, may be disposed as close as desired to the limit of the upward movement of the piston 9, depending upon the compression ratio desired for the engine. Preferably it is located at the minimum practical clearance distance from the piston as indicated in Fig. 3, so that on compression dead center the body or mass of the compressed mixture will occupy the L-shaped space over one side of the piston and over the two valves. By this arrangement the deflecting wall 7 is constituted by a shoulder on the head structure and is efficiently cooled by the jacket water in the cylinder head and advantages of combustion accrue from the compact disposition of the charge. In any event the deflecting wall 7 is so related to the rest of the cylinder head as to avoid excessive temperatures occurring in it. This may be done in any way which provides an adequate heat-conducting path from the wall to the surrounding water or other heat-abstracting medium.

The spark plug may be located at any suitable point where it will reach the compressed mixture, but it has been found that the most efficient operation of the engine occurs when the plug is situated directly over the exhaust valve, that is to say, at the angle or corner of the L-shaped space above referred to.

The invention has been above described as incorporated in a water-cooled engine, but it will now be apparent that the same arrangement of the deflecting wall 7 can be incorporated in an air-cooled engine, if preferred, and it will be further understood that the structural design of the invention is subject to variation in accordance with the preference of the engine builder, and that the advantages of the deflecting wall will be present, whether the same is formed as a part of a removable cylinder head or as a part of the cylinder body so long as it is sufficiently cooled by the water jacket or the external air current.

I claim:

1. In an engine of the character described, a cylinder, a piston, a cylinder head provided with a primary valve controlled combustion chamber to one side of the cylinder and also provided with a secondary combustion chamber communicating with the primary chamber and sloping downwardly therefrom and extending above the piston face at least to the plane extending through the adjacent piston axes and remote from the piston face center, said cylinder head having a wall providing a minimum clearance above the remainder of the piston face when the piston is at the upper limit of its stroke, intake and exhaust valves for said primary chamber arranged to provide cooling of the exhaust valve by the intake gases passing from the primary chamber to the cylinder.

2. In an engine of the character described, a cylinder, a piston, a cylinder head provided with a primary valve controlled combustion chamber to one side of the cylinder and also provided with a straight secondary combustion chamber communicating with the primary chamber and sloping downwardly therefrom and extending above the piston face at least to the plane extending through the adjacent piston axes and remote from the piston face center, said cylinder head having a wall providing minimum clearance above the remainder of the piston face when the piston is at the upper limit of its stroke, and intake and exhaust valves for said primary chamber arranged to provide cooling of the exhaust valve by the intake gases passing from the primary chamber to the cylinder.

3. In an engine of the character described, a cylinder, a piston, a cylinder head provided with a primary valve controlled combustion chamber to one side of the cylinder and also provided with a secondary combustion chamber communicating with the primary chamber and sloping downwardly therefrom, said secondary chamber overlying approximately a quadrant of the piston face the sides of which quadrant are defined by the transverse axial plane of the piston and the plane of adjacent piston axes, said cylinder head having a wall providing minimum clearance above the remainder of the piston face when the piston is at the upper limit of its stroke, and intake and exhaust valves for said primary chamber arranged to provide cooling of the exhaust valve by the intake gases passing from the primary chamber to the cylinder.

In testimony whereof, I have signed this specification.

JOHN GOOD.